(12) United States Patent
Bonazzoli et al.

(10) Patent No.: US 9,350,730 B2
(45) Date of Patent: May 24, 2016

(54) BIOMETRIC-BASED WIRELESS DEVICE ASSOCIATION

(71) Applicant: International Business Machines Corporation, Armonk, NY (US)

(72) Inventors: Simone Bonazzoli, Monte Porzio Catone (IT); Ilaria Gorga, Rome (IT); Riccardo Pizzutilo, Rome (IT); Alessandro Tomasi, Aprilia (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 235 days.

(21) Appl. No.: 14/078,371

(22) Filed: Nov. 12, 2013

(65) Prior Publication Data

US 2014/0136851 A1 May 15, 2014

Related U.S. Application Data

(63) Continuation of application No. 13/676,195, filed on Nov. 14, 2012.

(51) Int. Cl.
| | | |
|---|---|---|
| G06F 15/16 | (2006.01) | |
| H04L 29/06 | (2006.01) | |
| H04W 12/06 | (2009.01) | |
| H04W 88/02 | (2009.01) | |

(52) U.S. Cl.
CPC ........... *H04L 63/0861* (2013.01); *H04W 12/06* (2013.01); *H04W 88/02* (2013.01)

(58) Field of Classification Search
CPC .................................................. H04L 63/0861
USPC ................................................. 709/228, 229
See application file for complete search history.

(56) References Cited

U.S. PATENT DOCUMENTS

| | | | |
|---|---|---|---|
| 6,819,219 B1 | 11/2004 | Bolle et al. | |
| 7,512,254 B2 | 3/2009 | Vollkommer et al. | |
| 7,664,961 B2 | 2/2010 | Blattner et al. | |
| 7,941,534 B2 | 5/2011 | de la Huerga | |
| 2003/0023882 A1* | 1/2003 | Udom ................ | G07C 9/00087 726/5 |
| 2005/0250472 A1 | 11/2005 | Silvester et al. | |
| 2009/0193514 A1 | 7/2009 | Adams et al. | |
| 2012/0284328 A1* | 11/2012 | Chung ................ | H04L 67/2833 709/203 |

OTHER PUBLICATIONS

Wang, J. et al.; Secure Authentication and Authorization Scheme for Mobile Devices; Internet abstract from IEEE Xplore Digital Library (http://ieeexplore.ieee.org/xpl/login.jsp?tp=&arnumber=5349208 &url=http%3A%2F%2Fieeexplore.ieee.org%2Fxpls°/02Fabs_all.jsp°/03Farnumber°/03D5349208); 2009.

* cited by examiner

*Primary Examiner* — Adnan Mirza
(74) *Attorney, Agent, or Firm* — James L. Baudino

(57) ABSTRACT

According to one aspect of the present disclosure, a method and technique for automatically associating a wireless device to a data processing system using biometric data is disclosed. The method includes: receiving biometric data corresponding to a user of a data processing system; creating a certificate by the data processing system based on the biometric data; discovering a wireless device able to communicate with the data processing system; responsive to discovering the wireless device, automatically requesting a certificate from the wireless device; and, responsive to the certificate from the wireless device matching the certificate created by the data processing system, automatically associating the wireless device with the data processing system.

4 Claims, 5 Drawing Sheets

BIOMETRIC-BASED WIRELESS DEVICE ASSOCIATION

BACKGROUND

There are a variety of types of apparatuses or devices generally owned and/or used by a person that are configured for wireless communications, such as smartphones, digital media or MP3 players, digital cameras, laptop computers, etc., using Bluetooth or other wireless communication standards. These wireless communication devices may by associated and/or paired with counterpart devices in order to carry out communications and/or facilitate the control or exchange of data therebetween.

BRIEF SUMMARY

According to one aspect of the present disclosure a method and technique for automatically associating a wireless device to a data processing system is disclosed. The method includes: receiving biometric data corresponding to a user of a data processing system; creating a certificate by the data processing system based on the biometric data; discovering a wireless device able to communicate with the data processing system; responsive to discovering the wireless device, automatically requesting a certificate from the wireless device; and, responsive to the certificate from the wireless device matching the certificate created by the data processing system, automatically associating the wireless device with the data processing system.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
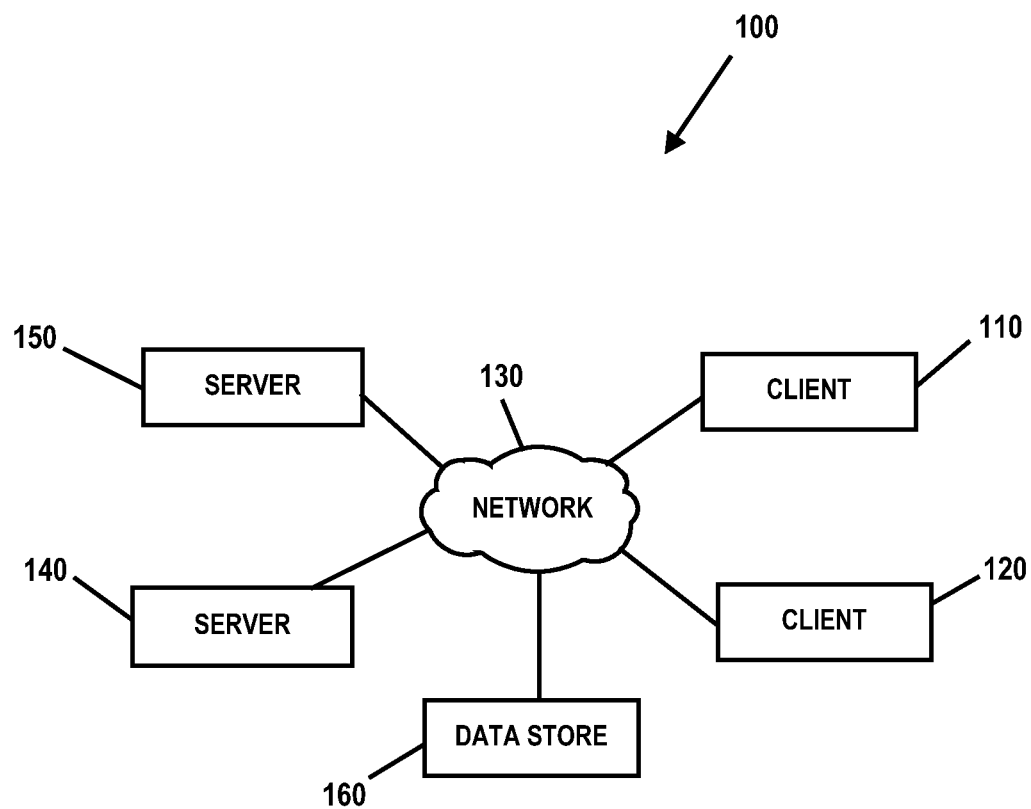
FIG. 1 is an embodiment of a network of data processing systems in which the illustrative embodiments of the present disclosure may be implemented.

Embodiments of the present disclosure provide a method, system and computer program product for automatically associating a wireless device to a data processing system using biometric data. For example, in some embodiments, the method and technique includes: receiving biometric data corresponding to a user of a data processing system; creating a certificate by the data processing system based on the biometric data; discovering a wireless device able to communicate with the data processing system; responsive to discovering the wireless device, automatically requesting a certificate from the wireless device; and, responsive to the certificate from the wireless device matching the certificate created by the data processing system, automatically associating the wireless device with the data processing system. Thus, embodiments of the present disclosure enable a user to identify and/or pre-configure wireless devices owned and/or controlled by the user with a biometric signature or key that indicates that the respective wireless devices are owned and/or controlled by the user. Thereafter, such wireless devices are easily and quickly paired with a desired computing system in response to the user inputting a biometric characteristic into the desired computing system. Wireless devices containing the user's biometric key are quickly identified, authenticated and linked/paired to the desired computing system based on and/or in response to the user's biometric input to the desired computing system.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
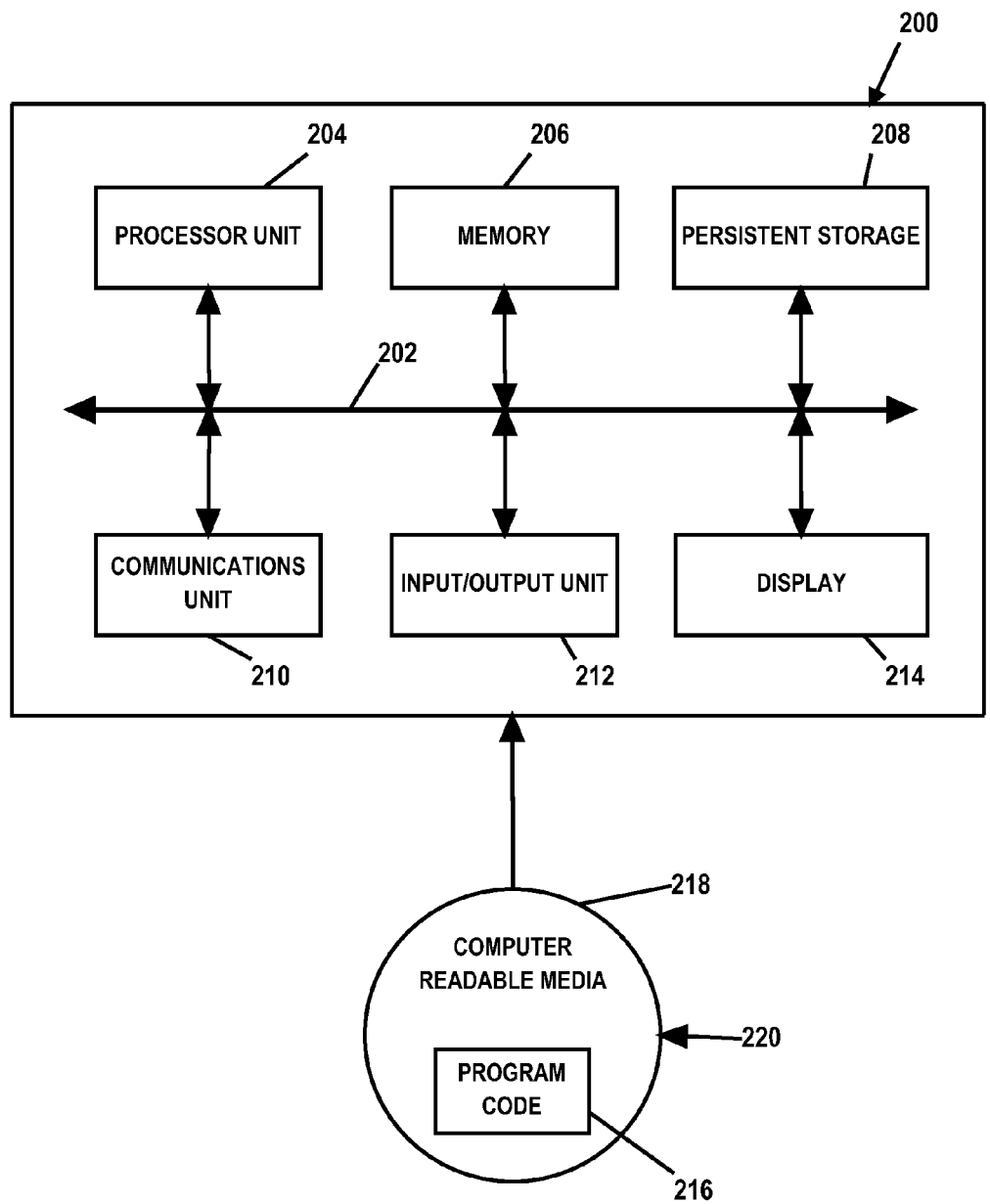
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers and/or computing or data processing devices in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wide area network (WAN), a telephone switching infrastructure, etc. FIG. 1 is intended as an example, and not as an architectural limitation for the different illustrative embodiments.

FIG. 2 is an embodiment of a data processing system 200 such as, but not limited to, client 110 and/or server 140 in which an embodiment of a biometric-based wireless device association method and system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
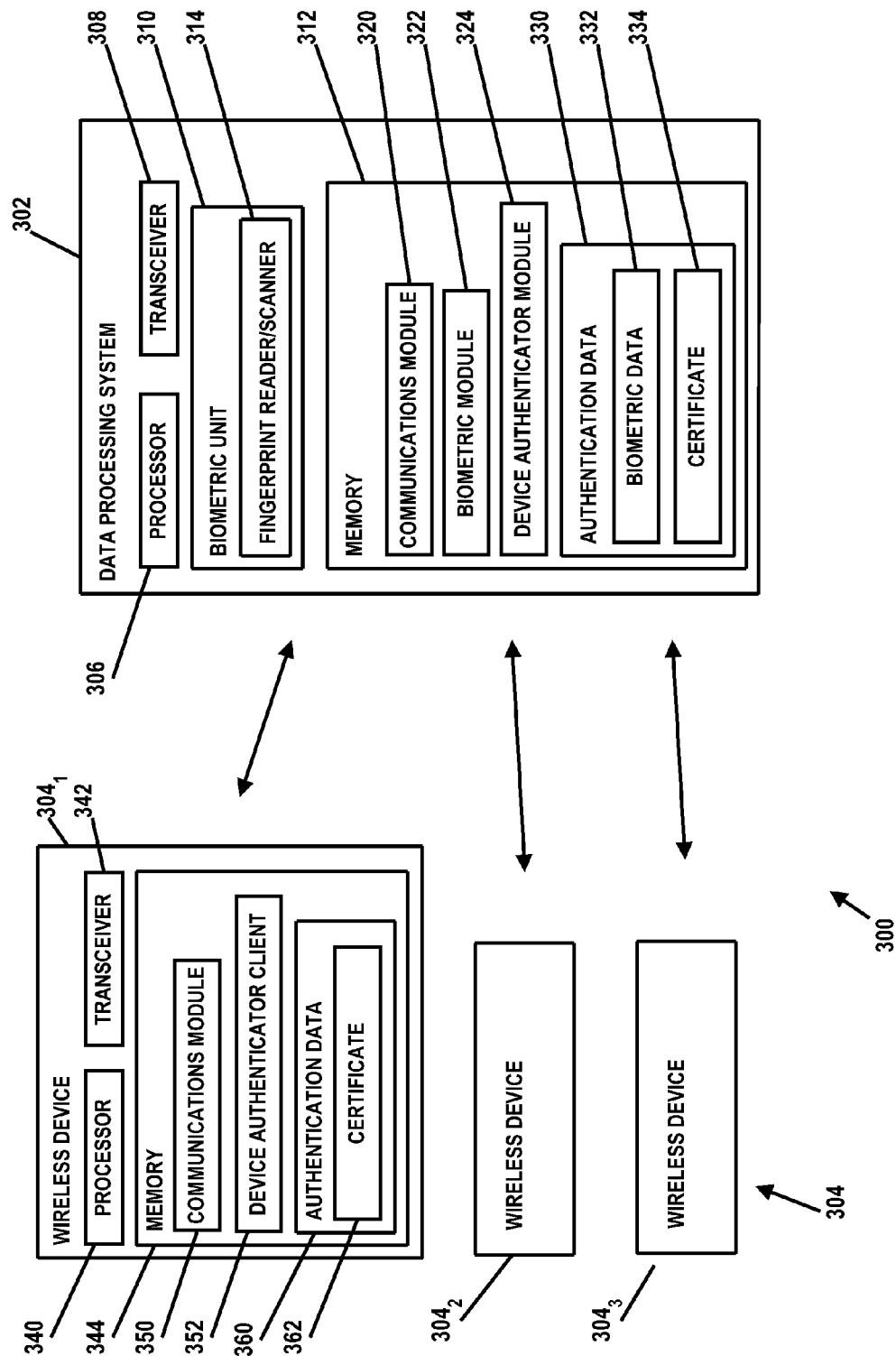
FIG. 3 is a diagram illustrating an embodiment of a data processing system for biometric-based wireless device association in which illustrative embodiments of the present disclosure may be implemented.

FIG. 3 is an illustrative embodiment of a system 300 for biometric-based wireless device association. System 300 may be implemented on data processing systems or platforms such as, but not limited to, servers 140 and/or 150, clients 110 and/or 120, or at other data processing system locations. For example, in the embodiment illustrated in FIG. 3, system 300 comprises a data processing system 302 and one or more wireless devices 304 (e.g., wireless devices $304_1$, $304_2$ and $304_3$). Data processing system 302 may comprise any type of computing device or platform and may comprise a processor 306, a transceiver 308, a biometric unit 310, and a memory 312. Transceiver 308 is configured for receiving and transmitting wireless communications between data processing system 302 and other devices, such as wireless devices 304. The wireless communications may be based on the Bluetooth standard or other type of wireless communication standard/protocol. Biometric unit 310 is configured for receiving biometric information and/or data corresponding to a user of data processing system 302. The biometric information may comprise any type of biometric data such as, but not limited to, fingerprint information, retinal scan information, or other types of biometric information characteristic of and/or uniquely identifying a particular user of data processing system 302. In the embodiment illustrated in FIG. 3, biometric unit 310 comprises a fingerprint reader/scanner 314; however, it should be understood that other types of biometric devices may be used based on the type of biometric information used in system 300.

In the embodiment illustrated in FIG. 3, memory 312 comprises a communications module 320, a biometric module 322, and a device authenticator module 324. Communications module 320 is configured to enable two-way wireless communications between data processing system 302 and other devices, such as wireless devices 304. Biometric module 322 is configured to receive, process, manipulate, convert and/or otherwise generate digital and/or analog information corresponding to biometric information of a user (e.g., generating digital information based on a fingerprint scan). Device authenticator module 324 is configured to generate a unique key or certificate corresponding to a user of data processing system 302 based on biometric information of the user and use the generated certificate to automatically associate, pair and/or link one or more wireless devices (e.g., wireless devices 304) to data processing system without further user intervention (e.g., without the need for the user to manually configure and/or input a passcode or pairing code for associating wireless devices with data processing system 302). Communications module 320, biometric module 322, and/or device authenticator module 324 may be implemented in any suitable manner using known techniques that may be hardware-based, software-based, or some combination of both. For example, communications module 320, biometric module 322, and/or device authenticator module 324 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 3, memory 312 comprises authentication data 330 comprising information associated with authenticating and associating wireless devices with data processing system 302. For example, in the illustrated embodiment, authentication data 330 includes biometric data 332 and a certificate 334. Biometric data 332 may comprise any type of information associated with a biometric characteristic of a user such as, but not limited to, an analog and/or digital representation of a fingerprint scan obtained using fingerprint reader/scanner 314. Certificate 334 comprises information associated with a unique key or signature corresponding to the user based on and/or derived from biometric data 332 of the user generated by device authenticator module 324. For example, in some embodiments, device authenticator module 324 may comprise a hash function or other type of algorithm for generating a bit string, hash value or other type of unique signature based on biometric data 332 corresponding to a user.

In FIG. 3, multiple wireless devices are illustrated. For ease of description and illustration, wireless device $304_1$ will be described below; however, it should be understood that other wireless devices may be similarly configured (e.g., wireless devices $304_2$ and $304_3$). In the illustrated embodiment, wireless device $304_1$ comprises a processor 340, a transceiver 342, and a memory 344. Transceiver 342 is configured for receiving and transmitting wireless communications relative to wireless device $304_1$ (e.g., between wireless device $304_1$ and data processing system 302 or other devices). For example, wireless device $304_1$ may comprise a Bluetooth-enabled device or other type of portable device configured for wireless communications. In the embodiment illustrated in FIG. 3, memory 312 comprises a communications module 350 and a device authenticator client 352. Communications module 320 is configured to enable two-way wireless communications between wireless device $304_1$ and other devices and/or systems (e.g., other wireless devices and/or data processing system 302). Device authenticator client 352 is configured to interface with device authenticator module 324 of data processing system 302 to enable wireless device $304_1$ to be initially configured with an authentication mechanism to enable wireless device $304_1$ to be thereafter easily and automatically associated with and/or otherwise paired to another computing platform or data processing system. For example, associating and/or pairing of a wireless device with another counterpart device/system may be achieved by each device sharing a passcode or pairing key to establish or maintain a communication link. Once paired, communications can be shared between the two devices using the established communication link. The receiving device generally utilizes only that information transmitted with a recognized device identification. For example, in short range communication systems such as those using the Bluetooth standard, the device identification is transmitted during the pairing and discovery process thereby enabling devices that are in range of one another to identify each device and subsequently establish a wireless link. However, to initially pair the devices, at least one of the devices will generally search for and display discovered devices within communication range. The discovered devices may be displayed to a user to enable the user to select the device the user desires to pair with the discovering device. Once a desired device for pairing is selected, a passcode or pairing code must be input by the user to be shared between the two devices. Embodiments of the present invention obviate the need for the user to manually input a passcode or pairing code to associate or pair the user's wireless devices with counterpart systems/devices. As will be further described below, a wireless device owned and/or controlled by the user is configured with a personal certificate or key of the user (e.g., based on a biometric characteristic of the user) such that, when it is desired to associate/pair the wireless device to another counterpart device/system, the user need only to input the biometric characteristic to the counterpart device/system. The counterpart device/system will automatically search for wireless devices owned/controlled by the user (e.g., wireless devices containing the user's personal certificate/key) and automatically associate/pair such devices with the counterpart device/system.

Communications module 350 and/or device authenticator client 352 may be implemented in any suitable manner using known techniques that may be hardware-based, software-based, or some combination of both. For example, communications module 350 and/or device authenticator module client 352 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 3, memory 344 comprises authentication data 360 comprising information for authenticating and associating wireless device $304_1$ with a data processing system. For example, in the illustrated embodiment, authentication data 360 includes a certificate 362. Certificate 362 comprises information associated with a unique key or signature corresponding to a user or owner of wireless device $304_1$ based on and/or derived from a biometric characteristic of the user/owner (e.g., as generated by device authenticator module 324 based on a fingerprint scan or other biometric characteristic of the user/owner).

In operation, wireless devices 304 are initially configured with an authentication mechanism to enable such wireless devices 304 to be thereafter easily and automatically associated/paired with a desired computing platform or data processing system. For example, during the initial configuration phase, data processing system 302, which may represent a computing platform owned by a user, such as a home computer or other computing platform, may be used to store on wireless devices 304 owned or selected by the user a certificate generated and/or otherwise derived based on a biometric characteristic of the user. For example, in operation, the user/owner may launch device authenticator module 324, which automatically identifies wireless devices 304 connected with data processing system 302. Device authenticator module 324 may present the user with a list of the identified wireless devices 304 to enable the user to identify and select wireless devices 304 the user would like to configure for biometric-based wireless pairing/association with other computing platforms. In response to receiving a selection of certain wireless devices 304, device authenticator module 324 may request that the user initiate a biometric input to data processing system 302 via biometric unit 310. In the illustrated embodiment, device authenticator module 324 may request that the user initiate a fingerprint scan using fingerprint reader/scanner 314.

Responsive to receiving biometric data 332 via biometric unit 310 corresponding to the user, device authenticator module 324 generates and/or otherwise derives certificate 334 based on biometric data 332. Device authenticator module 324 interfaces with device authenticator client 352 of the selected wireless devices 304 to distribute and/or otherwise transmit certificate 334 to the selected wireless devices 304, which is thereafter stored on the receiving wireless devices 304 by device authenticator client 352 as certificate 362. Upon the completion of the configuration phase for the selected wireless devices 304, device authenticator module 324 may be configured to automatically purge biometric data 332 and certificate 334 from memory 312. For example, in some embodiments, device authenticator module 324 may be configured to query the user whether there are additional wireless devices 304 to configure. In response to receiving a negative reply to the query, device authenticator module 324 may thereafter automatically cause biometric data 332 and certificate 334 to be deleted and/or purged from memory 312.

After select wireless devices 304 have been configured having stored thereon certificate 362, such wireless devices 304 may thereafter be easily and automatically associated, paired and/or linked to other computing platforms or data processing systems based on a biometric input of the user to such other computing platforms or data processing systems. For instance, as an illustrative example, consider that data processing system 302 of FIG. 3 now represents a computing platform at a place of business of the user or a third party computing platform (e.g., a computing platform of a friend or relative). To initiate an association, pairing and/or linking of the user's wireless devices 304 to data processing system 302, an instance of device authenticator module 324 residing on data processing system 302 is launched. In some embodiments, device authenticator module 324 may query the user as to whether the user desires to configure wireless devices or associate/pair wireless devices. Alternately, in some embodiments, in response to launching or execution of device authenticator module 324, device authenticator module 324 may first attempt to automatically associate/pair any wireless device located in the vicinity of data processing system 302 with data processing system 302 and thereafter, if wireless devices are discovered that have not been preconfigured with the user's biometric certificate, query whether the user owns the discovered devices such that the user may attempt to configure such discovered wireless devices with the user's biometric certificate.

In some embodiments, responsive to the launching or execution of device authenticator module 324, device authenticator module 324 interfaces with communications module 320 and/or otherwise identifies wireless device(s) 304 in the vicinity of data processing system 302 and/or otherwise able to wirelessly communicate with data processing system 302. In some embodiments, device authenticator module 324 will attempt to interface with device authenticator client 352 on such wireless devices 304 to request a certificate (e.g., certificate 362) from each identified wireless device 304. If a particular wireless device 304 does not respond and/or otherwise transmit a certificate to data processing system 302, device authenticator module 324 may be configured to refuse and/or otherwise reject an association/pairing of such wireless device 304 to data processing system 302.

In some embodiments, in response to receiving a certificate from at least one wireless device 304, device authenticator module 324 may request that the user input a biometric characteristic via biometric unit 310, such as a fingerprint scan using fingerprint reader/scanner 314. Device authenticator module 324 may temporarily store the received biometric characteristic as biometric data 332. Responsive to receiving biometric data 332, device authenticator module 324 generates and/or otherwise derives certificate 334 based on biometric data 332. Device authenticator module 324 then compares the newly generated certificate 334 with the received certificate 362. If the received certificate 362 matches certificate 334, device authenticator module 324 automatically associates, pairs and/or links the particular wireless device 304 to data processing system 302 (e.g., without requesting a password or other configuration data from the user).

Device authenticator module 324 may alternatively be configured such that in response to biometric data 332 being received from a user, device authenticator module 324 automatically generates certificate 334 and automatically requests authentication information from each unpaired wireless device 304 and, responsive to a match between the generated certificate 324 and a certificate received from a respective wireless device 304, the wireless device 304 is automatically paired/associated with the data processing system 302. Thus, in this embodiment, a user need only enter a biometric whereby device authenticator module 324 thereafter automatically identifies and authenticates wireless devices "owned" by the user (i.e., those wireless devices 304 having a certificate based on a biometric of the user) and associates/pairs the wireless devices 304 to the corresponding computing platform to enable the user to interact with the wireless device 304 via the computing platform.

In some embodiments, device authenticator module 324 is configured to automatically purge biometric data 332 and certificate 334 (and any certificate received from a wireless device 304) from memory 312. For example, in some embodiments, after identified wireless devices 304 have been either associated/paired with data processing system 302 or refused/rejected an association with data processing system 302, device authenticator module 324 may cause biometric data 332 and certificate information to be deleted from memory 312. In other embodiments, in response to a cessation or completion of communication interaction between associated wireless devices 304 and data processing system 302, device authenticator module 324 may cause biometric data 332 and certificate information to be deleted from memory 312. Thus, in some embodiments, device authenticator module 324 is configured to prevent the retention of the user's biometric information on data processing system 302.

Figure 4:
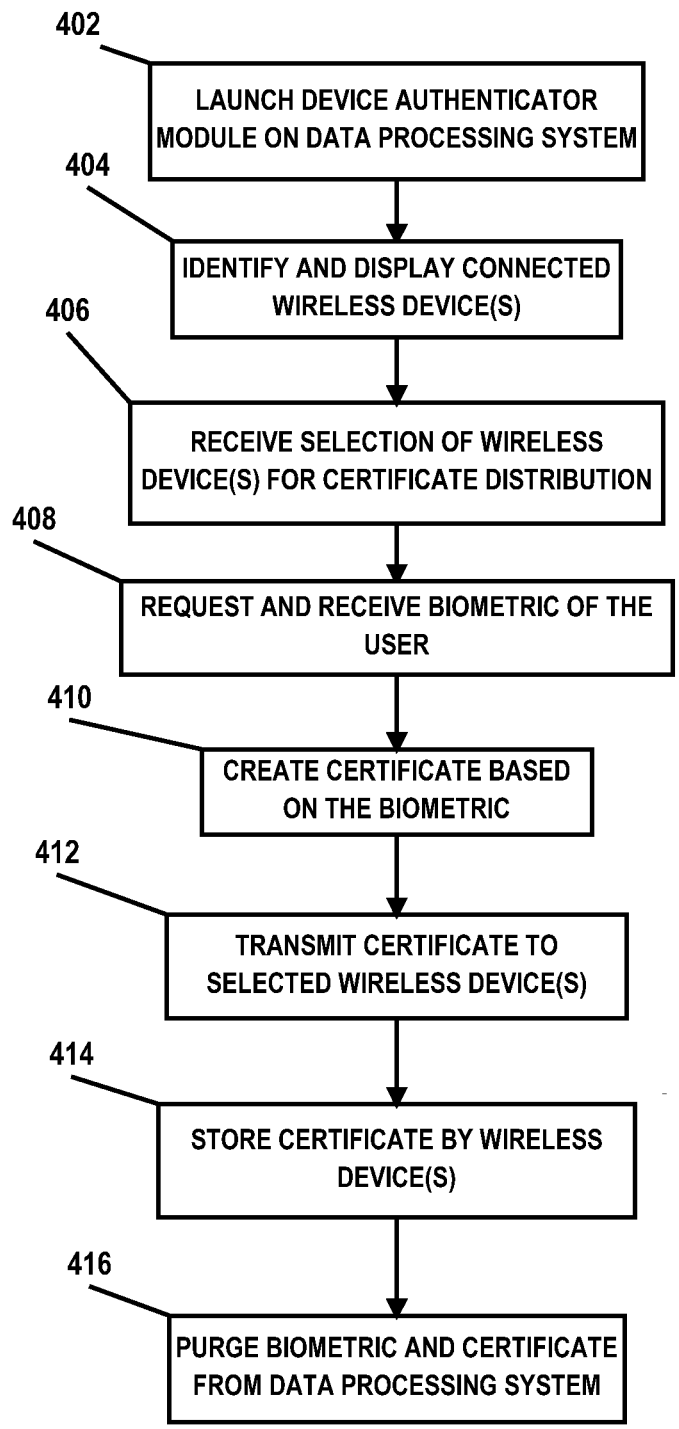
FIG. 4 is a flow diagram illustrating an embodiment of a method for biometric-based wireless device association.

FIG. 4 is a flow diagram illustrating an embodiment of a method for biometric-based wireless device association. The method begins at block 402, where device authenticator module 324 on data processing system 302 is launched. At block 404, device authenticator module 324 and/or in cooperation with communications module 320 identifies and/or displays to a user presently connected wireless devices 304 to data processing system 302. At block 406, device authenticator module 324 receives a selection of wireless devices 304 to preconfigure with the owner's biometric certificate. At block 408, device authenticator module 324 receives via biometric unit 310 a biometric associated with the user. At block 410, device authenticator module 324 creates certificate 334 based on biometric data 332 received for the user.

At block 412, device authenticator module 324 transmits a copy of certificate 334 to the selected wireless devices 304. At block 414, the receiving wireless devices 304 store certificate 334 as certificate 362 in respective memories 344 of wireless devices 304. At block 416, device authenticator module 324 purges biometric data 332 and certificate 334 from memory 312.

Figure 5:
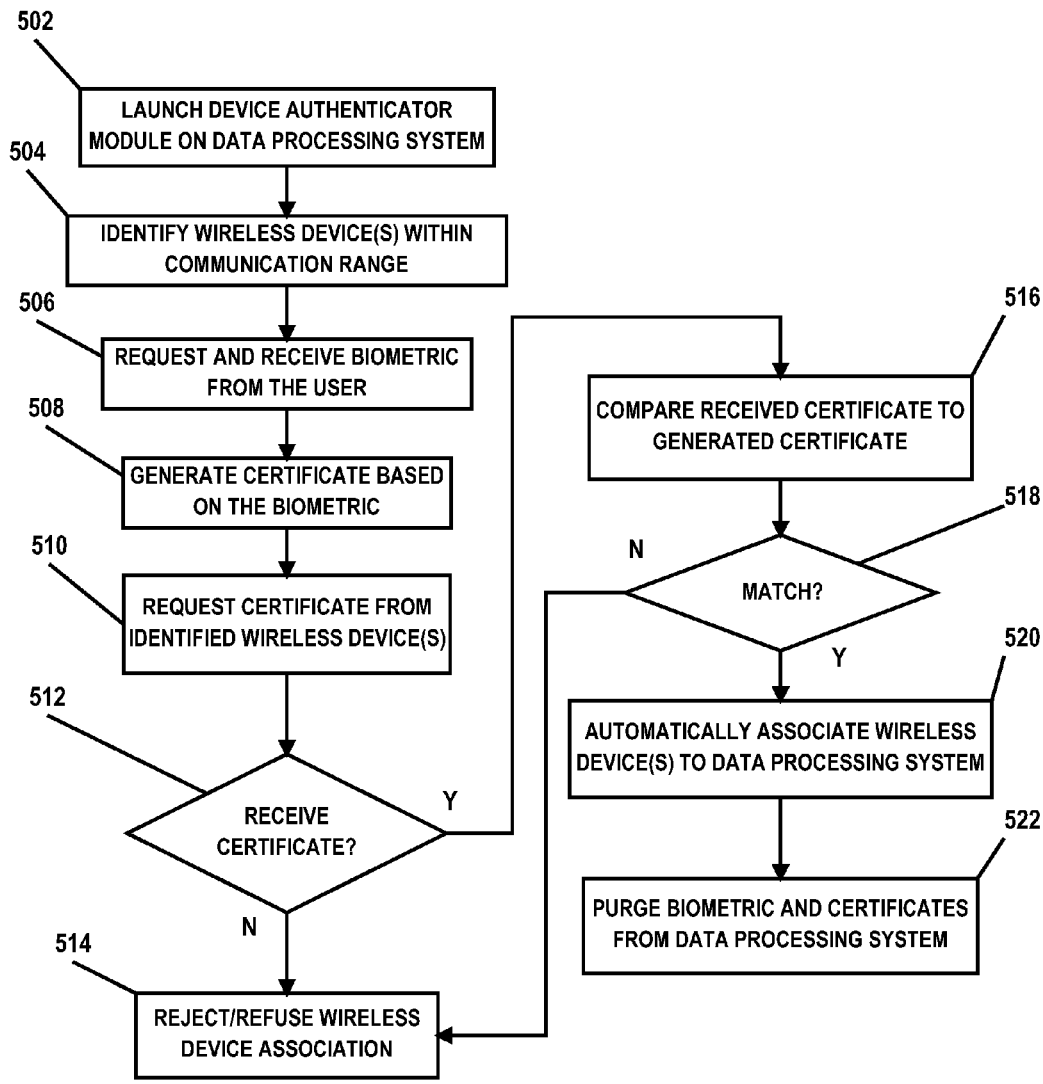
FIG. 5 is a flow diagram illustrating another embodiment of a method for biometric-based wireless device association.

FIG. 5 is a flow diagram illustrating another embodiment of a method for biometric-based wireless device association. The method begins at block 502, where device authenticator module 324 is launched on data processing system 302. At block 504, device authenticator module 324 (alone or in combination with communications module 320) identifies wireless devices 304 within wireless communication range of data processing system 302. At block 506, device authenticator module 324 requests from the user and receives a biometric characteristic of the user. For example, in some embodiments, device authenticator module 324 may request that the user input a fingerprint scan using fingerprint reader/scanner 314. Device authenticator module 324 thereafter stores the biometric as biometric data 332.

At block 508, device authenticator module 324 generates certificate 334 based on biometric data 332. At block 510, device authenticator module 324 (alone or in combination with communications module 320) requests from a particular wireless device 304 an authentication certificate. At decisional block 512, a determination is made whether data processing system 302 has received a certificate from the corresponding wireless device 304. If not, the method proceeds to block 514, where device authenticator module 324 rejects and/or otherwise refuses an association/pairing of the particular wireless device 304 with data processing system 302. If a certificate is received at decisional block 512, the method proceeds to block 516, where device authenticator module 324 compares the received certificate (e.g., certificate 362) with the recently generated certificate 334. At decisional block 518, a determination is made whether the certificate received from the wireless device 304 matches the recently generated certificate 334. If not, the method proceeds to block 514, where device authenticator module 324 rejects and/or otherwise refuses an association/pairing of wireless device 304 with data processing system 302. If at decisional block 518 is determined that the certificate received from wireless device 304 matches the recently generated certificate 334, the method proceeds to block 520, where device authenticator module 324 automatically associates and/or otherwise wirelessly links/pairs the particular wireless device 304 to data processing system 302 to enable wireless communications and the transfer/sharing of data therebetween by the user. At block 522, device authenticator module 324 purges biometric data 332 and certificate 334 (along with any certificate received from a wireless device 304) from memory 312 or other storage of data processing system 302.

Thus, embodiments of the present disclosure enable wireless devices to be quickly and automatically associated/paired with a desired computing platform in response to the input of a biometric characteristic of the user. For example, embodiments of the present disclosure enable a user to identify and/or pre-configure wireless devices owned and/or controlled by the user with a biometric signature or key that indicates that the respective wireless devices are owned and/or controlled by the user. Thereafter, such wireless devices are easily and quickly paired with a desired computing system in response to the user inputting a biometric characteristic into the desired computing system. Wireless devices containing the user's biometric key are quickly identified, authenticated and linked/paired to the desired computing system based on and/or in response to the user's biometric input to the desired computing system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
responsive to receiving an input of biometric data from a user of a data processing system, automatically creating a certificate by the data processing system based on the biometric data;
automatically requesting a biometric-based certificate from an unpaired wireless device discovered by the data processing system; and
responsive to the certificate from the wireless device matching the certificate created by the data processing system, automatically pairing the wireless device with the data processing system; and
after pairing the wireless device with the data processing system, automatically purging the biometric data and the certificates from the data processing system.

2. The method of claim 1, wherein receiving the biometric data comprises receiving a fingerprint of the user.

3. The method of claim 1, further comprising, responsive to determining that the wireless device lacks a certificate matching the certificate created by the data processing system, refusing an association of the wireless device to the data processing system.

4. The method of claim 1, further comprising preconfiguring a wireless device owned by the user with a certificate generated based on the biometric data.

* * * * *